(12) United States Patent
Katsir et al.

(10) Patent No.: US 6,234,166 B1
(45) Date of Patent: May 22, 2001

(54) ABSORBER-REFLECTOR FOR SOLAR HEATING

(75) Inventors: Dina Katsir, Beer Sheva; Zvi Finkelstein, Aseret; Israel Tartakovsky; Irina Tartakovsky, both of Kiryat Gat, all of (IL)

(73) Assignee: Acktar Ltd., Kiryat Gat (IL)

( * ) Notice: Subject to any disclaimer, the term of this patent is extended or adjusted under 35 U.S.C. 154(b) by 0 days.

(21) Appl. No.: 09/343,536

(22) Filed: Jun. 30, 1999

(51) Int. Cl.[7] .................................. F24J 2/00; F24J 2/48
(52) U.S. Cl. ........................ 126/701; 126/702; 126/714; 126/907
(58) Field of Search ..................... 126/907, 908, 126/705, 707, 708, 569, 701, 702, 703, 648, 650

(56) References Cited

U.S. PATENT DOCUMENTS

| | | | |
|---|---|---|---|
| 3,987,780 | * | 10/1976 | Nozik et al. . |
| 4,002,159 | * | 1/1977 | Angilletta . |
| 4,320,155 | * | 3/1982 | Gillery . |
| 4,487,197 | * | 12/1984 | Hoyois ................ 126/901 |
| 5,523,132 | * | 6/1996 | Zhange et al. .......... 126/907 |

FOREIGN PATENT DOCUMENTS

| | | | | |
|---|---|---|---|---|
| 2923251 | * | 12/1980 | (DE) ................... 126/907 |
| 0052569 | * | 5/1982 | (EP) ................... 126/907 |
| 35413942 | * | 10/1979 | (JP) ................... 126/648 |

OTHER PUBLICATIONS

Solar Energy Materials, 1, (1979) 391, 328–338, 340–341, "Coatings for Enhanced Photothermal Energy Collection", by Carl M. Lampert.

Solar Energy Materials and Solar Cells, 44 (1996) 69–78, "Cathodi c ARC Deposition of Solar Thermal Selective", by Y. Yin et al.

AIAA, (1992), 88–97, "Estimation of the End–Of–Life Optical Properties of Z–93 Thermal Control Coating for the Space Station Freedom" by Mark M. Hasegawa et al.

\* cited by examiner

*Primary Examiner*—Carl D. Price
(74) *Attorney, Agent, or Firm*—Hedman & Costigan, P.C.

(57) ABSTRACT

A solar absorber-reflector is provided for solar heat transmission into a heat absorbing chamber and/or repelling back of solar heat resulting from incident solar radiation. The solar absorber-reflector is also suitable as a passive thermal control material for space applications, and consists of several layers. The minimal configuration includes three basic layers: a layer with a selective solar radiation absorbing surface, having high absorptance of solar radiation and low thermal emittance; a layer with a light-reflecting surface facing a direction opposite to the selective solar radiation absorbing surface; and a polymer film being transparent to visible light and possessing high thermal emittance, with a heat-emitting surface facing the same direction as the light-reflecting surface. The various layers and surfaces of the solar absorber-reflector are oriented, constructed and bonded together, enabling operation in a solar-heating mode, in which the incident solar radiation is absorbed and the resulting solar heat is transmitted into the heat absorbing chamber, or in a light-reflector mode, in which the incident solar radiation is reflected and the resulted solar heat is repelled back and prevented from penetrating into the heat absorbing chamber, or in a mixed mode, in which a part of the solar absorber-reflector operates in a solar-heating mode and a part of the solar-absorber-reflector operates in a light-reflection mode, simultaneously.

18 Claims, 2 Drawing Sheets

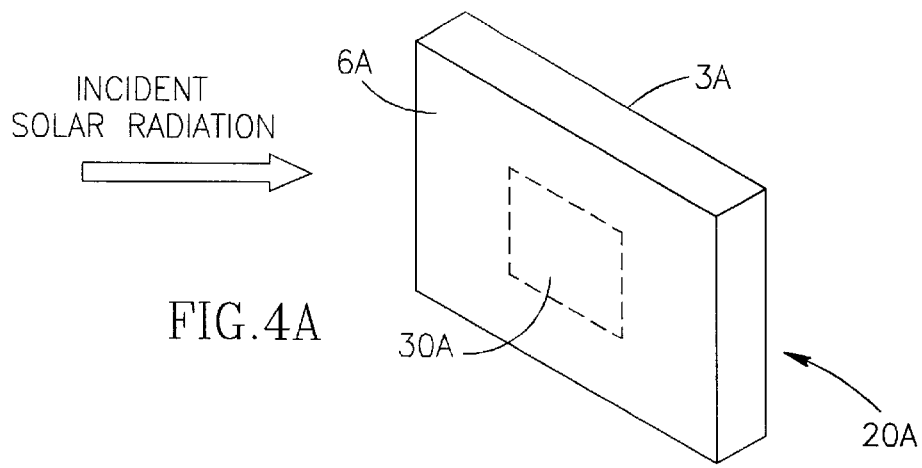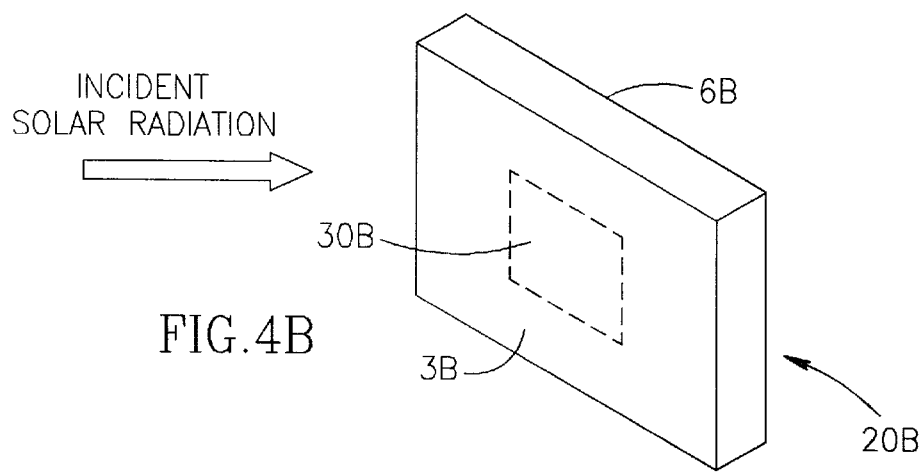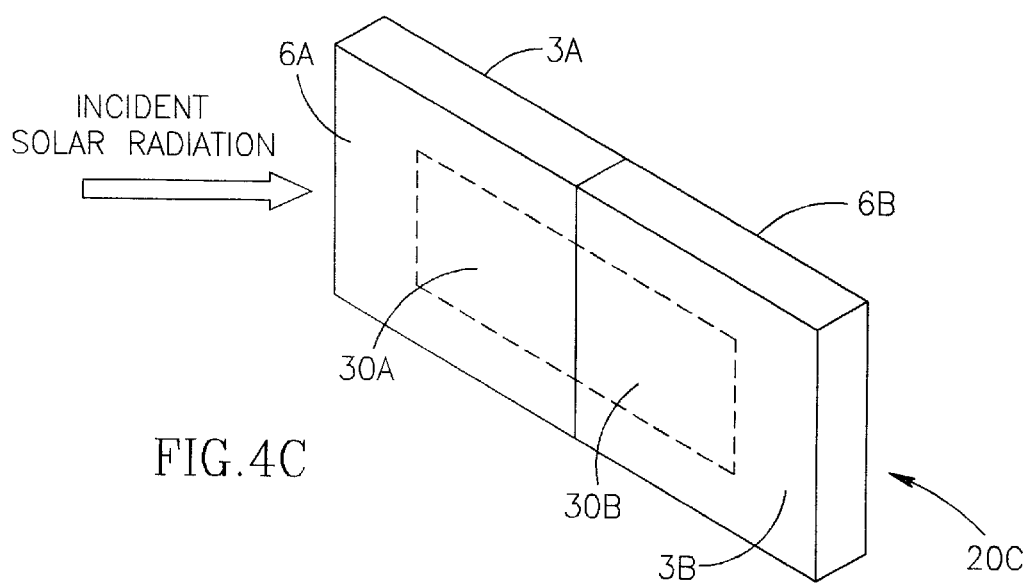

ABSORBER-REFLECTOR FOR SOLAR HEATING

FIELD AND BACKGROUND OF THE INVENTION

The present invention relates to utilization of solar energy and, more particularly, to a solar absorber-reflector for alternately transmitting and repelling back solar heat resulting from incident solar radiation.

There already exist solar absorber-reflectors, such as the Venetian blinds taught in U.S. Pat. No. 4,002,159. These blinds, usually installed at room windows, have slats that are rotatable through 180 degrees, where one face is bearing a layer of material with a usual black nonselective light-absorbing surface, while the other face is a light-reflecting surface.

For room heating in cold weather, the venetian blind slats are oriented in such a way that their light-reflecting surfaces face the interior of the room, and their light-absorbing surfaces are directed outward. This is a solar-heating mode, in which the light-absorbing surface absorbs solar radiation, which is converted into heat and transferred into the room interior. In hot weather, the venetian blind slats are rotated through 180 degrees. This is a light-reflection mode, in which the solar radiation is reflected, preventing from overheating the room interior.

However, the thermal efficiency of such venetian blinds is rather low. First of all, high thermal emittance of the nonselective light-absorbing surface results in a loss of a significant part of the heat absorbed in solar-heating mode, due to the re-emission from the light-absorbing surface (unless the venetian blind is shielded by a window pane, and the warmed up air circulates into the room interior). Furthermore, when operating in the light-reflection mode, a certain heating of the light-reflecting surface occurs under exposure to solar radiation, resulting in an undesired heat transfer into the room interior.

The thermal efficiency of devices similar to the venetian blinds described above can be increased to a certain extent, by replacing the nonselective light-absorbing surfaces with selective solar radiation absorbing surfaces. Selective solar radiation absorbing surfaces are surfaces with reduced amount of re-emission losses of the absorbed solar radiation, and hence increased efficiency of solar heating. This is achieved by low thermal emittance combined with high absorptance of the solar radiation. Materials that can be used for manufacturing selective solar radiation absorbing surfaces exist in many varieties. (Further details can be found in the publication "Coating for enhanced photothermal energy collection" by C. M. Lampert, "Solar Energy Materials", 1, 319–341, 1979).

A method for making a multiple layer solar absorber-reflector is taught in U.S. Pat. No. 4,320,155. A transparent substrate such as soda-lime-silica glass is vacuum coated with a first layer of a reflective metal such as aluminum, a second layer of a light absorbing semi-conducting material such as germanium or silicon, and a third layer of an antireflective material such as silicon monoxide, for enhancing the absorption of the light absorbing layer.

However, the thermal efficiency of solar absorber-reflectors still remains rather low, even with the use of selective solar radiation absorbing surfaces. In the solar-heating mode, intensive heat transfer from the layer of material with the selective solar radiation absorbing surface to the room interior, is prevented due to poor thermal emittance of the light-reflecting surface. This results in overheating of the layer of material with the selective solar radiation absorbing surface, and hence in an increase of heat losses by both convection heat transfer and re-emission of additional heat by this surface. Furthermore, solar absorber-reflectors with a selective solar radiation absorbing surface, while operating in the light-reflection mode, still feature a certain heating of the light-reflecting surface under exposure to solar radiation, resulting in an undesired heat transfer into the room interior, as with the venetian blinds described above.

There exists a certain type of absorbers of solar radiation with thermal efficiency which is significantly higher than that of the above mentioned solar absorber-reflectors, when operating in the solar-heating mode. Such absorbers of solar radiation contain, besides the material layer with a selective solar radiation absorbing surface, an additional material layer with a heat-emitting surface facing the direction opposite to the selective solar radiation absorbing surface.

The above mentioned overheating of the material layer with the selective solar radiation absorbing surface does not occur in absorbers of solar radiation with a heat-emitting surface, due to intensive heat transfer from the layer of material with the selective solar absorbing surface into the room interior through the heat-emitting surface which increases the thermal efficiency of these absorbers of solar radiation. However, solar absorber-reflectors, utilizing a selective solar radiation absorbing surface together with a heat-emitting surface for the solar-heating mode, as well as a light-reflecting surface for the light-reflection mode, have not yet been practically configured. In order to obtain a surface most simple from the technological point of view, and possessing simultaneously the properties of light reflection and heat emittance, special paints can be applied. (Further details can be found in the publication "Estimation of the end-of-life optical properties of Z-93 thermal control coating for the space station Freedom", by M. M. Hasegava and H. W. Babel, AIAA Papers, AIAA-92-2168-CP, 1992, p. 88). However, these paints are very expensive, and require thorough and complicated pre-painting preparation of the surface. Therefore, solar absorber-reflectors utilizing these paints are not worthwhile economically. Furthermore, even such solar absorber-reflectors, while operating in the light-reflection mode, still feature a certain heating of the light-reflecting surface under exposure to solar radiation, resulting in an undesired heat transfer into the room interior, as with the previously mentioned solar absorber-reflectors.

There is thus a widely recognized need for, and it would be highly advantageous to have, a multi-layer solar absorber-reflector, that is simple to manufacture, install and operate, utilizing the solar energy for room heating in efficient manner, on an attractive economical basis. Namely, the properties of the solar absorber-reflector should include providing intensive heat transfer through a light-absorbing surface into the room interior in the solar-heating mode for heat accumulation, such as in cold weather, and reducing heating of a light-reflecting surface under exposure to solar radiation in the light-reflection mode, significantly preventing solar heat from penetrating into the room interior, such as in hot weather.

SUMMARY OF THE INVENTION

The present invention provides a device and method to satisfy the aforementioned need.

According to the present invention there is provided a solar absorber-reflector for alternatively transmitting into a heat absorbing chamber and repelling back solar heat resulting from incident solar radiation, including; (a) a first set of layers, including: (i) a layer with a selective solar radiation absorbing surface, for absorbing the solar heat in a solar-heating mode in which the selective solar radiation absorbing surface is exposed to the incident solar radiation, (ii) a layer with a light-reflecting surface facing a direction opposite to the selective solar radiation absorbing surface, for reflecting the solar radiation in a light-reflection mode in which the light-reflecting surface is exposed to the incident solar radiation; and (iii) a layer with a heat-emitting surface facing the same direction as the light-reflecting surface, for re-emitting the solar heat into the heat absorbing chamber in the solar-heating mode, and for repelling the solar heat from penetrating into the heat absorbing chamber in the light-reflection mode.

According to the present invention there is provided a method for solar heating of a chamber, comprising the steps of: (a) providing a solar absorber-reflector for alternately transmitting into the chamber and repelling back solar heat resulting from incident solar radiation, including: (i) a first set of layers, including: (A) a layer with a selective solar radiation absorbing surface, for absorbing the solar heat in a solar-heating mode in which the selective solar radiation absorbing surface is exposed to the incident solar radiation, (B) a layer with a light-reflecting surface facing a direction opposite to the selective solar radiation absorbing surface, for reflecting the solar radiation in a light-reflection mode in which the light-reflecting surface is exposed to the incident solar radiation; and (C) a layer with a heat-emitting surface facing the same direction as the light-reflecting surface, for re-emitting the solar heat into the chamber in the solar-heating mode, and for repelling the solar heat from penetrating into the chamber in the light-reflection mode; and (b) positioning the solar absorber-reflector in an orientation selected from the group consisting of: (i) the solar-heating mode, in which the light-reflecting and heat-emitting surfaces are facing the chamber, and the selective solar radiation absorbing surface is facing outward, being exposed to solar radiation; and (ii) the light-reflection mode, in which the selective solar radiation absorbing surface is facing the chamber, and the light-reflecting and heat-emitting surfaces are facing outward, being exposed to solar radiation.

According to the present invention there is provided a method for solar heating of a chamber, including the steps of: (a) providing a solar absorber-reflector for alternately transmitting into the chamber and repelling back solar heat resulting from incident solar radiation, including: (i) a first set of layers, including: (A) a layer with a selective solar radiation absorbing surface, for absorbing the solar heat in a solar-heating mode in which the selective solar radiation absorbing surface is exposed to the incident solar radiation; (B) a layer with a light-reflecting surface facing a direction opposite to the selective solar radiation absorbing surface, for reflecting the solar radiation in a light-reflection mode in which the light-reflecting surface is exposed to the incident solar radiation; and (C) a layer with a heat-emitting surface facing a same direction as the light-reflecting surface, for re-emitting the solar heat into the chamber in the solar-heating mode, and for repelling the solar heat from penetrating into the chamber in the light-reflection mode; and (ii) a second set of layers, including: (A) a layer with a selective solar radiation absorbing surface, for absorbing the solar heat in a solar-heating mode in which the selective solar radiation absorbing surface is exposed to the incident solar radiation; (B) a layer with a light-reflecting surface facing a direction opposite to the selective solar radiation absorbing surface, for reflecting the solar radiation in a light-reflection mode in which the light-reflecting surface is exposed to the incident solar radiation; and (C) a layer with a heat-emitting surface facing a same direction as the light-reflecting surface, for re-emitting the solar heat into the chamber in the solar-heating mode, and for repelling the solar heat from penetrating into the chamber in the light-reflection mode, wherein the selective solar radiation absorbing surface of the second set of layers faces in a direction opposite to the selective solar radiation absorbing surface of the first set of layers; and (b) positioning the solar absorber-reflector in a mixed mode in which the first set of layers is positioned in the solar-heating mode, and the second set of layers is positioned in the light-reflection mode, simultaneously.

The solar absorber-reflector according to the present invention allows for absorbing incident solar radiation and transmitting the resulting heat into a heat absorbing chamber, such as a room interior, and/or reflecting the incident solar radiation and preventing the resulting heat from penetrating into the heat absorbing chamber, depending on the position of the solar-absorber toward the incident solar radiation. The solar absorber-reflector according to the present invention is also suitable as a passive thermal control material for space applications.

The solar absorber-reflector according to the present invention consists of several layers, where the minimal configuration includes three basic layers. The first basic layer is an polymer film which is transparent to visible light and possesses high thermal emittance. The outer surface of the polymer layer is the heat-emitting surface of the solar absorber-reflector. The polymer layer serves as a substrate to the second basic layer, which has a light-reflecting surface adjacent to the polymer film. The second basic layer serves as a substrate to the third basic layer having high absorptance of solar radiation and low thermal emittance. The outer surface of the third basic layer is the selective solar radiation absorbing surface of the solar absorber-reflector. The second and third basic layers are preferably made of aluminum and aluminum black, respectively. These layers are preferably manufactured using a common process of vacuum deposition. (A short review of deposition technologies can be found in the publication "Cathodic arc deposition of solar thermal selective surfaces", by Y. Yin et al, "Solar Energy Materials and Solar Cells", 1996, Vol. 44, pp. 69–78).

The basic configuration of a solar absorber-reflector according to the present invention, and the other configurations described below, which include several more intermediate material layers and substrates, have some prominent advantages over the prior art. Similar to the prior art, the heat-emitting surface, while operating in a solar-heating mode, ensures intensive heat transfer from the material layer with selective solar absorbing surface to the heat absorbing chamber, which increases the thermal efficiency of the solar absorber-reflector significantly. However, a physical separation between the light-reflecting and heat-emitting surfaces in the preferred embodiments of the present invention, makes it possible to avoid using costly materials and methods, such as applying special paints, that were previously required for creation of surfaces that possess light-reflecting and heat-emitting properties simultaneously.

Furthermore, placing a light transparent material layer with a heat-emitting surface, in the preferred embodiments of the present invention, in front of a light-reflecting surface alongside of the solar absorber-reflector exposed to incident solar radiation in the light-reflection mode, reduces heating of the light-reflecting surface and repels back the solar heat, preventing the heat from penetrating into the heat absorbing chamber. This solar heat removal is achieved due to the fact that though the incident solar radiation, passing through the material layer with the heat-emitting surface and reflected backward by the light-reflecting surface, heats up the solar absorber-reflector, this heat is removed by heat emission from the heat-emitting surface.

According to another preferred embodiment of the present invention, the solar absorber-reflector includes the same basic three material layers, but the substrate for the third basic material layer with the selective solar radiation absorbing surface is not the second basic material layer with the light-reflecting surface, but a metal substrate layer, which is bonded to the second basic material layer by an adhesive layer. The metal substrate layer is preferably made of aluminum, because aluminum is one of the best light reflectors, and there are well known techniques of applying layers with selective solar radiation absorbing surface, such as a aluminum black, to aluminum.

As a variation of the preferred embodiment of the present invention including a metal substrate layer, a surface of the metal substrate layer serves as the light-reflecting surface of the solar absorber-reflector. In this case, the metal substrate layer is bonded to the polymer film by an adhesive layer that is transparent to visible light.

According to further feature in the preferred embodiments described below, the various material layers and substrates of the solar absorber-reflector are made of flexible materials, enabling rolling up the solar absorber-reflector and thus simplifying the transportation, storage and utilization of the solar absorber-reflector.

According to still further feature in the described preferred embodiments, the solar absorber-reflector is construed so that part of the solar absorber-reflector operates in a solar-heating mode, absorbing the incident solar radiation and transmitting the resulting heat into the heat absorbing chamber, and part of the solar absorber-reflector operates in a light-reflection mode, reflecting the incident solar radiation and repelling back the resulting heat, simultaneously. In such a mixed mode, of simultaneous heat-absorbing and light-reflection, the proportion between heat transmission and heat repelling can be adjusted according to the position of the solar absorber-reflector toward the incident solar radiation.

The present invention successfully addresses the shortcomings of the presently known configurations by providing a multi-layer solar absorber-reflector, that is simple to manufacture, install and operate, enabling controlled solar heat transmission into heat absorbing chambers and/or repelling back the solar heat, on efficient and cost-effective basis.

BRIEF DESCRIPTION OF THE DRAWINGS

The invention is herein described, by way of example only, with reference to the accompanying drawings, wherein:

FIGS. 4a–c are schematic perspective views of solar absorber-reflectors according to the present invention, in various positions relative to incident solar radiation.

DESCRIPTION OF THE PREFERRED EMBODIMENTS

Figure 1:
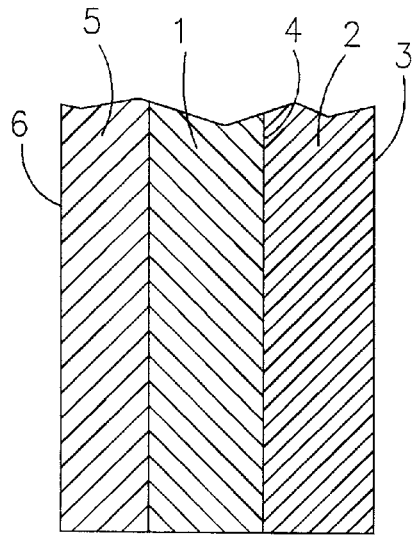
FIG. 1 is a schematic cross sectional view of a solar absorber-reflector according to a preferred embodiment of the present invention.

The present invention is of a solar absorber-reflector, which can be used for utilization of solar energy for room heating. Specifically, the present invention can be used for efficient absorption of solar heat into a heat absorbing chamber, such as a room interior in cold weather (solar-heating mode), and for reflecting solar radiation and preventing solar heat significantly from penetrating into the heat absorbing chamber, such as a room interior in hot weather (light-reflection mode).

The principles and operation of a solar absorber-reflector according to the present invention may be better understood with reference to the drawings and the accompanying description.

Before explaining the present invention in detail, it should be explained that the present invention is not limited in its application to the details of construction and the arrangement of the components set forth in the following description or illustrated in the drawings. The present invention is capable of other embodiments or of being practiced or carried out in various ways. Also, it is to be understood that the phraseology and terminology employed herein is for the purpose of description and should not be regarded as limiting.

Figure 2:
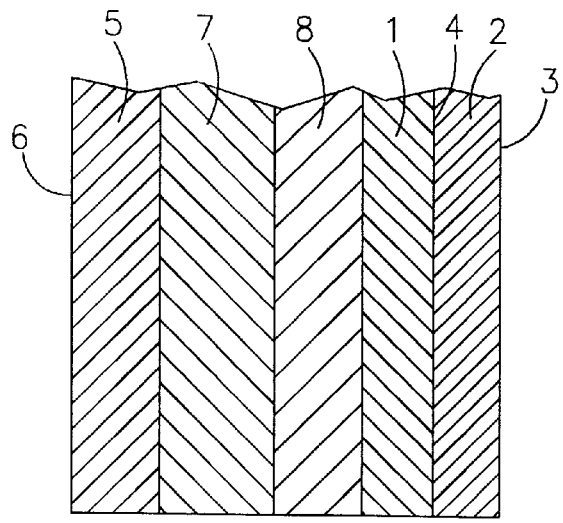
FIG. 2 is a schematic cross sectional view of a solar absorber-reflector according to another preferred embodiment of the present invention.
Figure 3:
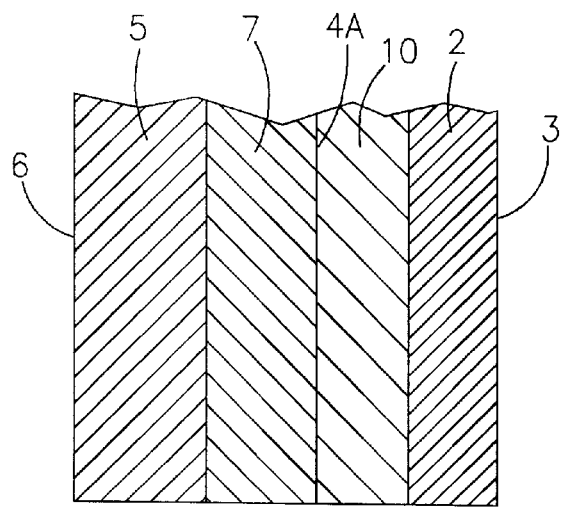
FIG. 3 is a schematic cross sectional view of a solar absorber-reflector according to yet another preferred embodiment of the present invention.

Referring now to the drawings, FIGS. 1–3 illustrate cross sectional views of a solar absorber-reflector according to several preferred embodiments of the present invention.

As shown in FIG. 1, a solar absorber-reflector 20 according to a preferred embodiment of the present invention includes several layers. A polymer film 2 is transparent to visible light, and possesses high thermal emittance that increases with the thickness of the film. The material for polymer film 2 preferably is, but is not limited to, polyethyleneterephtalat, polycarbonate, or any other material that one ordinarily skilled in the art can easily select, based on the well known technological level.

Referring further to FIG. 1, polymer film 2 has an outer surface 3, which is a heat-emitting surface. Polymer film 2 serves as a substrate for a layer 1 with a light-reflecting surface 4 adjacent to polymer film 2. Layer 1, in turn, serves as a substrate for a layer 5 having an outer surface 6, which is a selective solar radiation absorbing surface, with having absorptance of solar radiation and low thermal emittance.

Layer 1 with light-reflecting surface 4, and Layer 5 with selective solar radiation absorbing surface 6, preferably are made of, but are not limited to, vacuum deposited aluminum and aluminum black, respectively. Using aluminum has two major advantages. First, aluminum is one of the best light reflectors, and second, there are well known techniques of applying layers with selective solar radiation absorbing surface, such as aluminum black, to aluminum.

Furthermore, solar absorber-reflector 20 of FIG. 1, besides having a minimum number of layers, where each layer has a definite function and also serves as a substrate for the next layer, is also simple to manufacture. Such a solar absorber-reflector can be manufactured by means of vacuum deposition of aluminum on polymer film with the use of web (roll) coaters with further vacuum deposition of aluminum black over the formed aluminum deposit. This is a simple and straightforward technology because it allows using one and the same basic material (aluminum) and one and the same equipment for manufacturing the solar absorber-reflector. (Aluminum black deposit is a result is a result of the so called reactive deposition, based on evaporation of aluminum in an oxidizing environment). By contrast, the prior art method of making a multiple layer solar absorber-reflector as taught in U.S. Pat. No. 4,320,155 is more complicated, because different materials are used for the light-reflecting and light-absorbing layers (such as aluminum and germanium, respectively).

Furthermore, using the same basic material (aluminum) in solar absorber-reflector 20, for both layer 1 with light-reflecting surface 4, and layer 5 with selective solar radiation absorbing surface 6, also increases the adhesion strength and the corrosion resistance of the applied layers.

Solar absorber-reflectors, such as the one depicted in FIG. 1, operate as follows. In solar-heating mode, such as during cold weather, solar absorber-reflector 20 is oriented to let the incident solar radiation impinge on selective solar radiation absorbing surface 6. Heat-emitting surface 3 faces the heat absorbing chamber. Selective solar radiation absorbing surface 6 is heating by the incident solar radiation. The heat is further transmitted through heat-emitting surface 3 into the heat absorbing chamber. Selective solar radiation absorbing surface 6 with high absorptance of solar radiation and low thermal emittance, ensures efficient solar heat transfer into the heat absorbing chamber, while preventing heat losses from the chamber.

In light-reflection mode, such as during hot weather, solar absorber-reflector 20 is oriented to let the incident solar radiation impinge on heat-emitting surface 3 of polymer film 2. The incident sunbeams then reach light-reflecting surface 4 and are reflected outward. Under exposure to solar radiation, solar absorber-reflector 20 heats up to a certain extent. However, due to the high thermal emittance of heat-emitting surface 3, a considerable amount of the absorbed solar heat is re-emitted outward. Selective solar radiation absorbing surface 6 with low thermal emittance, now oriented inward the heat absorbing chamber, reduces the solar heat transfer into the heat absorbing chamber significantly.

As shown in FIG. 2, a solar absorber-reflector 20' according to another preferred embodiment of the present invention includes the same basic layers as solar absorber-reflector 20; polymer film 2 with heat-emitting surface 3, layer 1 with light-reflecting surface 4, and layer 5 with selective solar radiation absorbing surface 6. However, the substrate for layer 5 of solar absorber-reflector 20' is not layer 1, but a metal substrate layer 7, preferably made of aluminum, bonded to layer 1 by an adhesive layer 8.

Furthermore, polymer layer 2 of solar absorber-reflector 20' is not subjected to heating during the manufacturing process of the solar absorber-reflector as in solar absorber-reflector 20, because polymer layer 2 of solar absorber-reflector 20' is not involved in the process of applying layer 5 of aluminum black to metal substrate layer 7. This results in diminished requirements for thermal stability of polymer layer 2, thus increasing the variety of polymers that can be used.

Yet another preferred embodiment 20" of a solar absorber-reflector according to the present invention is shown in FIG. 3. Metal substrate layer 7 in FIG. 3, preferably made of aluminum, serves as a substrate for layer 5, as does metal substrate layer 7 in FIG. 2, but with the difference that a surface 4a of metal substrate layer 7 in FIG. 3 serves as the light-reflecting surface, so that metal substrate layer 7 in FIG. 3 is bonded to polymer film 2 by a light transparent adhesive layer 10.

As a further example of a preferred embodiment of the present invention, light transparent adhesive layer 10 may be made non-drying. The use of a non-drying adhesive allows the user to remove polymer film 2 and to use the remaining part of solar absorber-reflector 20" with adhesive applied to it, in devices requiring selective solar radiation absorbing surfaces, for example—solar water and air heaters.

As a useful variation of the preferred embodiments of the present invention, the elements of the solar absorber-reflector are made of flexible materials, enabling rolling up the solar absorber-reflector and thus simplifying the transportation, storage and utilization of the solar absorber-reflector.

Yet another useful variation of the preferred embodiments of the present invention is shown in FIG. 4c. While FIG. 4a shows a schematic perspective view of solar absorber-reflector 20a in a solar-heating mode, in which incident solar radiation impinges on an active area 30a marked with a broken line on a selective solar radiation absorbing surface 6a, and a heat-emitting surface 3a is facing away from the incident solar radiation, and while FIG. 4b shows a schematic perspective view of a solar absorber-reflector 20b in a light-reflection mode, in which incident solar radiation impinges on an active area 30b marked with a broken line on a heat-emitting surface 3b, and a selective solar radiation absorbing surface 6b is facing away from the incident solar radiation, FIG. 4c shows a schematic perspective view of a solar absorber-reflector 20c in a mixed solar-heating and light-reflection mode. Solar absorber-reflector 20c includes two set of layers, in such a way that heat-emitting surface 3b of the second set of layers is facing the same direction as selective solar radiation absorbing surface 6a of the first set of layers, and selective solar radiation absorbing surface 6b of the second set of layers is facing the same direction as heat-emitting surface 3a of the first set of layers. In a mixed solar-heating and light-reflection mode, as shown in FIG. 4c, part of the incident solar radiation impinges on active area 30a on selective solar radiation absorbing surface 6a, and part of the incident solar radiation impinges on active area 30b on heat-emitting surface 3b, simultaneously. In such a mixed mode, the proportion between heat transmission and heat repelling can be adjusted according to the proportion between the size of selective solar radiation absorbing surface 6a and the size of heat-emitting surface 3b exposed to solar radiation.

Although the invention has been described with respect to a limited number of embodiments, it is evident that many alternatives, modifications and variation will be apparent to those skilled in the art. Accordingly, the invention is intended to embrace all such alternatives, modifications and variations that fall within the spirit and broad scope of the appended claims.

What is claimed is:

1. A solar absorber-reflector for alternately transmitting into a heat absorbing chamber and repelling back solar heat resulting from incident solar radiation, comprising:
  (a) a first set of layers, including in the following sequence:
    (i) a layer with a selective solar radiation absorbing surface, for absorbing the solar heat in a solar-heating mode in which said selective solar radiation absorbing surface is exposed to the incident solar radiation;
    (ii) a layer with a light-reflecting surface facing a reverse direction in relation to said selective solar radiation absorbing surface, for reflecting the solar radiation in a light-reflection mode in which said light-reflecting surface is exposed to the incident solar radiation; and (iii) a layer with a heat-emitting surface facing said reverse direction, for re-emitting the solar heat in said solar-heating mode, and for repelling the solar heat in said light-reflection mode.

2. The solar absorber-reflector of claim 1, wherein said layer with said heat-emitting surface includes a polymer.

3. The solar absorber-reflector of claim 2, wherein said polymer is transparent to visible light.

4. The solar absorber-reflector of claim 1, wherein said layer with said light-reflecting surface includes a metal.

5. The solar absorber-reflector of claim 4, wherein said metal includes aluminum.

6. The solar absorber-reflector of claim 5, wherein said aluminum layer is made in a vacuum deposition process.

7. The solar absorber-reflector of claim 1, wherein said layer with said selective solar radiation absorbing surface is an aluminum black layer.

8. The solar absorber-reflector of claim 7, wherein said aluminum black layer is made in a vacuum deposition process.

9. The solar absorber-reflector of claim 1, wherein said layer with said heat-emitting surface serves as a substrate for said layer with said light-reflecting surface.

10. The solar absorber-reflector of claim 1, wherein said layer with said light-reflecting surface serves as a substrate for said layer with said selective solar radiation absorbing surface.

11. The solar absorber-reflector of claim 1, wherein said first layer further includes:

(iv) a metal layer serving as a substrate for said layer with said selective solar radiation absorbing surface.

12. The solar absorber-reflector of claim 11, wherein said metal substrate layer includes aluminum.

13. The solar absorber-reflector of claim 12, wherein said aluminum layer is made in a vacuum deposition process.

14. The solar absorber-reflector of claim 1, wherein at least some of said layers are bonded together by adhesive.

15. The solar absorber-reflector of claim 14, wherein said adhesive is transparent to visible light.

16. The solar absorber-reflector of claim 14, wherein said adhesive is a non-drying adhesive.

17. The solar absorber-reflector of claim 1, wherein at least some of said layers are flexible.

18. The solar absorber-reflector of claim 1, further comprising:

(b) a second set of layers, including in the following sequence:
(i) a layer with a selective solar radiation absorbing surface, for absorbing the solar heat in a solar-heating mode in which said selective solar radiation absorbing surface is exposed to the incident solar radiation;
(ii) a layer with a light-reflecting surface facing a reverse direction in relation to said selective solar radiation absorbing surface, for reflecting the solar radiation in a light-reflection mode in which said light-reflecting surface is exposed to the incident solar radiation; and
(iii) a layer with a heat-emitting surface facing said reverse direction, for re-emitting the solar heat in said solar-heating mode, and for repelling the solar heat in said light-reflection mode.

* * * * *